United States Patent [19]

Lemelson

[11] Patent Number: 4,535,414
[45] Date of Patent: Aug. 13, 1985

[54] POSITION INDICATING SYSTEM AND METHOD

[76] Inventor: Jerome H. Lemelson, 85 Rector St., Metuchen, N.J. 08840

[21] Appl. No.: 352,795

[22] Filed: Feb. 26, 1982

[51] Int. Cl.$^3$ .............................................. G05B 19/19
[52] U.S. Cl. .................................... 364/561; 364/474; 364/167
[58] Field of Search ............... 364/560, 561, 563, 167, 364/474; 318/640, 647, 652, 653, 685, 687

[56] References Cited

U.S. PATENT DOCUMENTS

| | | | |
|---|---|---|---|
| 3,681,582 | 8/1972 | Kimio et al. | 364/474 X |
| 4,038,890 | 8/1977 | Winget | 364/474 X |
| 4,049,942 | 9/1977 | Balleys et al. | 364/474 X |
| 4,203,064 | 5/1980 | Suzuki et al. | 364/559 X |
| 4,250,551 | 2/1981 | Paveglio, Jr. et al. | 364/474 |
| 4,338,556 | 7/1982 | Hetzel | 318/685 X |
| 4,370,721 | 1/1983 | Berenberg et al. | 364/560 X |
| 4,376,970 | 3/1983 | Ilseman et al. | 364/167 |
| 4,392,195 | 7/1983 | Inoue | 364/167 |

Primary Examiner—Edward J. Wise

[57] ABSTRACT

A position indicating system and method for use in detecting relative movement between machine components such as components of measuring machines, machine tools and other forms of machinery to be automatically and precisely controlled in operation. A lead or drive screw supported by one machine component or assembly contains marker recordings provided along one or more surfaces of its helical thread which recordings are scanned to generate pulses as the screw rotates in synchronization with the relative movement between machine components. The marker recordings may be provided along the base of the screw thread, either or both its side walls or the top wall or helical crown of the thread and may be photoelectrically, magnetically or otherwise detected by a sensor supported by a threaded bushing riding in the thread of the screw.

19 Claims, 6 Drawing Figures

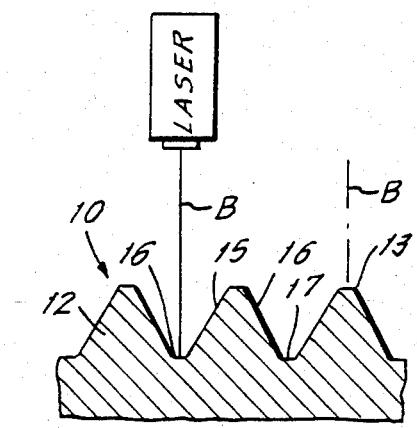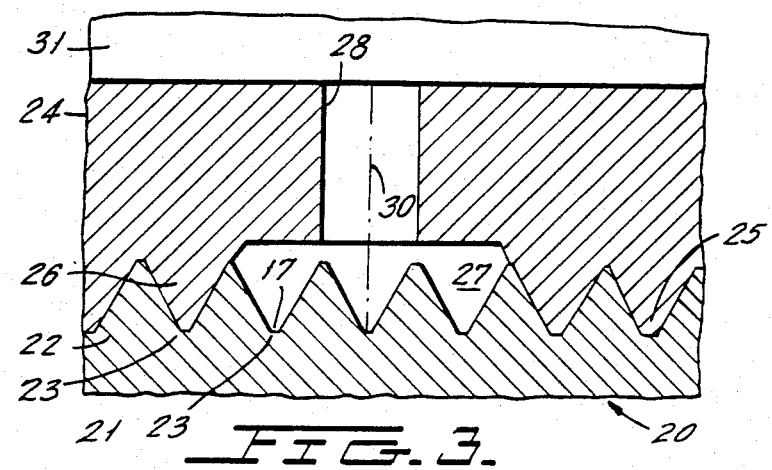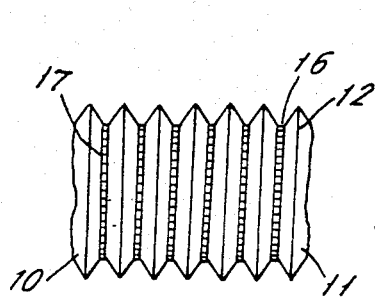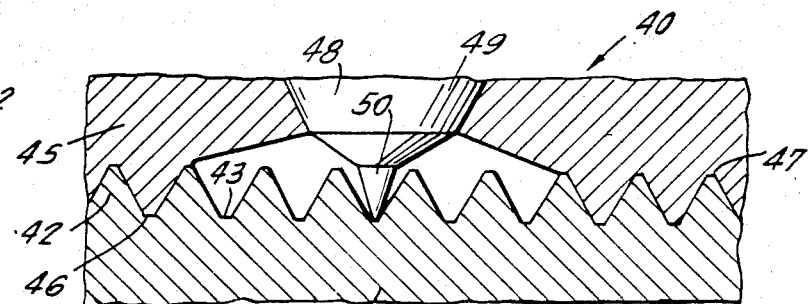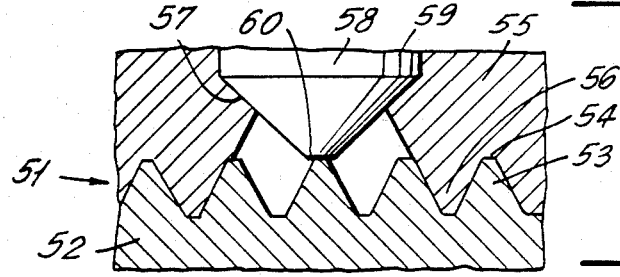

POSITION INDICATING SYSTEM AND METHOD

SUMMARY OF THE INVENTION

This invention relates to a position indicating system which is particularly applicable for indicating relative position or movement between machine components or assemblies such as associated with automatic measuring machines, machine tools and the like.

Relative movement between machine components has been measured and indicated in a number of manners taught in the prior art. Such indication has been effected by counting rotations or fractions of rotations of a drive shaft of a motor operating a machine or driving a component thereof, by photoelectrically scanning fringe patterns generated when two grids or gratings are alinged and moved with respect to each other as the machine components are moved, by magnetically sensing movement of a lineal device or scale or by other means. Such prior art lineal indicating and measurement systems suffer a number of shortcomings, including limitations relating to precision and degree of movement measurement possible therewith.

The instant invention employs fine recordings, such as so called micro-recordings of pulse or bit information provided in one or more walls of a fine screw such as a lead screw or drive screw and preferably extending along the bottom wall or crown of the thread thereof in a manner and structure such that such recordings are easily detectable and may be employed to generate pulse electrical signals with extremely small incremental movements of the screw in threaded bushing or such a bushing along the length of the thread as the threaded screw rotates in accordance with lineal movement between machine components, one of which supports or is supported by the screw and the other supporting a screw follower containing a sensor for the thread recordings. Such microrecordings are provided in one of a number of forms along the helical thread of the screw and may be photo-electrically, magnetically, capacitively, sonically or otherwise detected by a transducer scanning the thread as the screw rotates and the thread advances or the screw advances with its rotation through a threaded bushing. Such microrecordings may be in the form of magnetic pulse recordings in a magnetic recording material coating the screw thread, magnetic domains formed in a wall of the helical thread or a coating thereon, micro-cavities or pits formed in a wall of the thread by a pulsed laser beam, undulations in the thread wall or walls formed by controllably vibrating the tool which forms the thread or finishes same, deposited material or other means. Certain of such pulse or marker recordings, such as the magnetic recordings, magnetic domains or microcavities, may be between 0.0001" and 0.00005" in diameter or length or less and spaced an equal degree apart from each other extending along substantially the entire length of the thread. If such marker length is devided by forty or more threads per inch, it is apparent that pulses may be generated when the recordings are scanned wherein each pulse represents between 0.000004" and 0.000002" in incremental between the components supporting the screw and the sensor of the marker of pulse recordings in the thread of the screw, a very high degree of precision in the measurement of relative movement between machine components which may be used to advantage in precise position and control as well as coordinate measurement.

Accordingly it is a primary object of this invention to provide a new and improved system and method for measuring and indicating machine component movement.

Another object is to provide a system and method for indicating the relative movement between machine components by detecting increments of rotation of a screw which is rotating in synchronization with the movement of such machine components.

Another object is to provide an apparatus and method for electrically indicating the movement of machine elements or components to a high degree of precision.

Another object is to provide an apparatus and method for indicating machine component movement in increments of less than 0.00001 inches.

Another object is to provide a system and method for effecting lineal measurements of objects and assemblies to a precision of greater than 0.00001 inches.

Another object is a system and method for measuring machine component movement by scanning microrecordings provided in a surface of a helical thread.

Another object is to provide a system and method for measuring machine component movement to a high degree of precision by photoelectrically scanning marker recordings in a screw thread.

Another object is to provide a system and method for measuring machine component movement by magnetically detecting magnetic recordings in a screw thread which is advanced by rotation of the screw in synchronization with the movement.

Another object is to provide an improved method for measuring relative movement between machine components by scanning undulations formed in a machined surface during its machining or finishing.

Another object is to provide improved methods for recordmarkers in a machine part such as a machine screw thread for purposes of control and measurement.

Another object is to provide an improved method for magnetically encoding or marking metal surfaces with information or distance indicating marks.

Another object is to provide a new and improved structure in a machine screw for use as a control element in a machine system such as a machine tool or measuring tool.

With the above and such other objects in view as may hereinafter more fully appear, the invention consists of the novvel constructions, combinations and arrangements of parts and assemblies and methods described and illustrated in the accompanying drawings, but it is to be understood that changes, variations and modifications may be resorted to which fall within the scope of the invention as claimed.

DESCRIPTION OF THE DRAWINGS

FIG. 1 is a side cross sectional view of a portion of a machine screw, such as a lead screw or drive screw, and a means for effecting marker recordings along the bottom wall of the helical thread thereof.

FIG. 2 is a side view of a protion of the screw of FIG. 1 showing marker recordings provided in the bottom wall of the helical thread thereof.

FIG. 3 is a side crossectional view of an assembly of a portion of the screw of FIGS. 1 and 2 and part of an electrooptical reading device supported by a threaded bushing engaging the threads of the screw, which reading device is adapted to read the recordings in the thread wall as relatively rotational movement is effected between such bushing and the screw.

FIG. 4 is a side cross sectional view of a modified form of the screw and reading device shown in FIG. 3 and employing magnetic recordings in the thread wall and a magnetic pickup adapted to detect same as the screw is rotated.

FIG. 5 is a side cross sectional view of a portion of an assembly of a screw having marker recordings extending along the crown of the thread thereof and a magnetic pickup adapted to scan such recordings.

Figure 6:
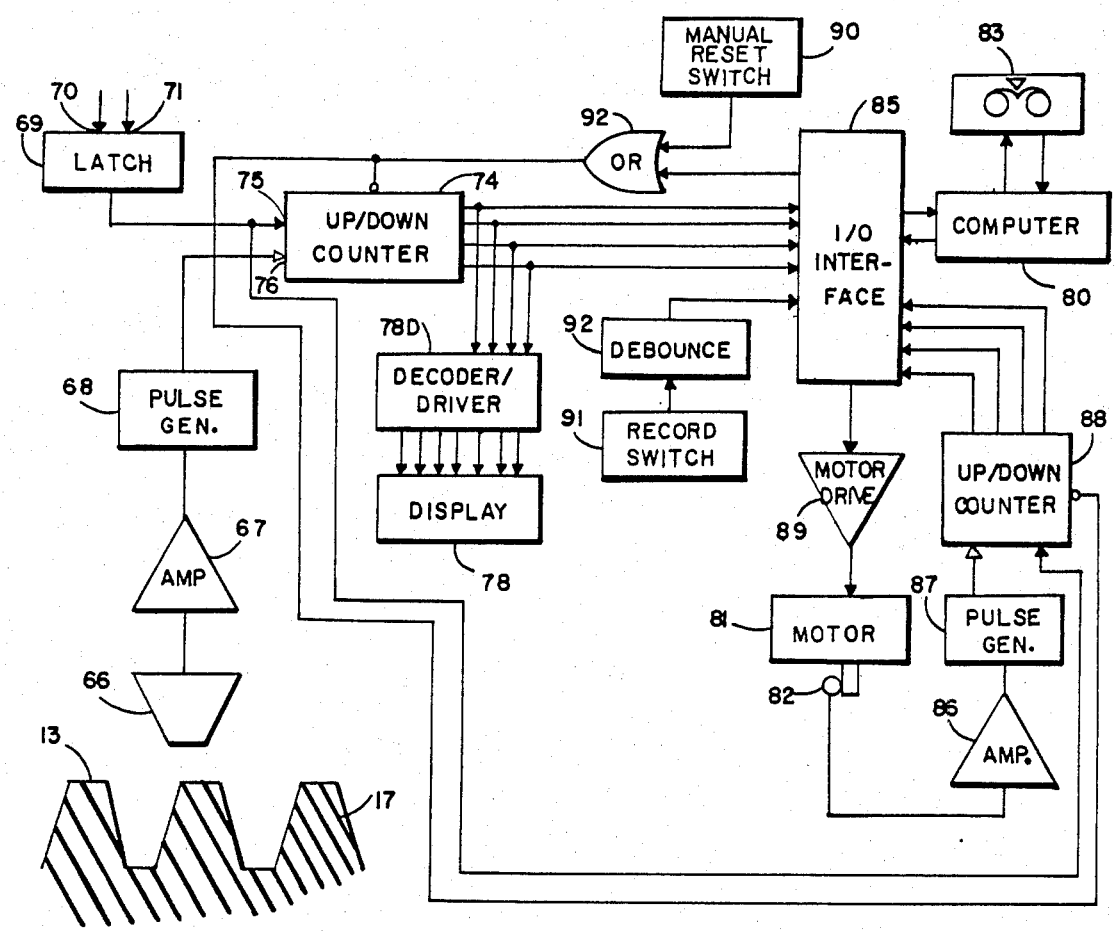
FIG. 6 is a schematic diagram of a control system employing a screw and thread scanning arrangement of the type shown in FIG. 5 but applicable to the other screw and scanning arrangements of the invention such as illustrated in FIGS. 1 to 4 and described hereafter.

While certain embodiments of the instant invention are illustrated in the drawings and described hereafter, modifications may be made thereto to provide the system and method for measuring and indicating by means of electrical signals relative movement between machine components or assemblies to effect automatic control of such movement and/or automatic measurement of articles of manufacture. For example, while the basic recording member is one or more surface portions of a machine screw made of metal and the recordings may comprise microcavities less than 0.001 inches in diameter and possibly as small as one or two micrometers and spaced apart from each other five micrometers or less, such microcavities may also be provided in a coating such as a metal film deposited in the surface of he screw thread or may be provided in other forms such as magnetic domains formed by rapidly melting small islands of the surface stratum of the base metal or coating and extremely rapid cooling thereof to form such domains of glassy, non-crystalline metal having magnetic properties distinct from that of the surrounding metal and therefore detectable by a suitable magnetic pickup. The marker recordings may also be defined by micro-areas of different color than the surrounding metal or coating on the thread formed by intense laser or electron beam pulsing or other means. The marker recirdings of equispaced distances along the thread of the screw may also be in the form of sinusoidal variations or otherwise shaped hills and valleys therein formed by suitably vibrating the cutting or forming tool used to form the screw thread or finish same.

In FIG. 1 is shown a portion of a metal screw 10, such as a lead screw or drive screw for a machine component or assembly supporting said screw and operable either to rotate with the rotation of a drive shaft or the linear movement of a machine component or to be rotated by a motor and, in so doing, to drive a machine component with respect to another machine component supported adjacent the screw. The screw 10 is provided with a helical thread 12 formed in the surface portion of its cylindrical base or shank 11, the thread having side walls 13 and 14, a crown 15 which may be cylindrically shaped or flat in cross section or rounded and a base 15 which may also be cylindrical or flat in cross section or rounded.

A plurality of microminiature markers 17 are recorded around one or more of the surfaces denoted 13, 14, 15 and 16 and may be recorded equispaced from each other in one of a number of manners. In FIG. 1, a radiation beam, such as a laser beam or electron beam B is generated as short duration pulses of beam energy as the screw is controllably rotated and is directed into the thread 12 along its spiral length while either the beam is moved longitudinal of the screw 10 or the screw is driven longitudinally to create or cause pulse marker recordings to be effected at equispaced locations of the record track defined by that portion of the thread scanned by the beam. Depending on the material of which the thread is made or the recording surface thereof is coated and the intensity of the beam B, the pulse recordings may be in the form of micro-cavities or pits formed by evaporation of melting of a small portion of the material of the thread or a coating thereon, or in the form of detectable changes in the material intersected by the pulsed beam. For example, tiny pits or cavities may be formed between 0.001 and 0.00001 inches in diameter and spaced an equal distance [0.001 to 0.000001 inches] apart by controlling the relative movement between the beam and the screw thread and the pulsing of the beam in synchronization with the thread movement which may be effected by controlling the operation of a motor power rotating such thread. Any or all of the surfaces 13-16 may also be formed with detectable sinusoidal undulations by vibrating the cutting tool used to form the thread 12 in the cylindrical rod of shank 11 as it cuts or finishes such threads. In another form, the pulse or marker recordings 17 may also comprise electro-optically or magnetically detectable variations in the physical characteristics of the material of the surface stratum of the metal forming the screw base or a coating thereon or such a coating disposed on the base 16, crown 15, walls 13 and 14 or a combination of such surface portions of the helical screw threads. For example, if the pulses of laser or electron beam energy are of sufficient intensity to melt a small quantity or "island" of the base metal or a metal coating which it intersects, and such melted metal cools and solidifies very rapidly, in the range of hundreds of thousands of degrees per second, the resulting solidified metal areas may be formed as domains of glassy, non-crystalline metal having magnetic characteristics different from the magnetic characteristics of the surrounding metal. Such domains may be detected by a magnetic pickup riding in or adjacent the thread. Permanently discoloration of the base metal forming the thread or a coating thereon in the areas intersected by the pulses of intense radiation, may be electro-optically detected by the photoelectric cell adapted to scan the thread track as the screw rotates in driving a machine component or in being driven by such a component as the component controllably moves with respect to another component.

In FIG. 2 is shown a portion 10A of a thread screw 10 wherein marker recordings 17 are recorded in the helical track defined by the base 16 of the thread and such recordings may be one of the above described recordings formed by one or more of the means described.

In FIG. 3, an assembly 20 is shown including a screw 21 which may be a so called lead screw driven by a machine component or a motor driving such a component as it operates in performing a controlled function wherein the degree of relative movement of the component with respect to its base or other component must be precisely controlled by signals generated which are indicative of such relative movement, such signals being generated by scanning and detecting small marker recordings provided in the thread of the screw as described. Notation 24 refers to a threaded bushing, bearing, follower or drive for the screw 21 having a cylindrical internal bore 25 and a helical thread 26 formed therein for mating and sliding engagement with the thread 22 of the screw. If member 24 is held stationary, the screw 21 may be power rotated and driven longitudinally in the threaded bore 25. Conversely, if the screw 21 is held fixed and rotated, and member 24 is longitudinally guided along the thread without rotation, such as by sliding engagement of member 24 or a machine component to which it is secured in a bore of an elongated bushing or along a way or slide, such member may be driven along the screw by rotation of the screw and engagement of the threads of both members while the screw remains fixed in position.

Notation 27 refers to a cavity or recess formed in the wall of the bore 25 of member 24. A hole 28 is drilled or otherwise formed extending radially from the surface of cavity 27 to the exterior of member 24 and a read beam 30, preferably generated by a laser or other light source located in a housing 29 secured to the outer surface of member 24, is directed to intersect base 23 of the thread 22 by screw 21 and to be modulated when it intersects the marker recordings 17 therein. The modulated beam energy reflected through the passageway 28 back to the opening or window in housing 29 is detected by a photoelectric detector in the housing 29 when generating an output signal which varies in amplitude each time a marker 17 modulates the reflected light and such is detected. Pulse signals formed by conventional means may then be counted to indicate the amount of rotation of screw 21 and relative movement between such screw and member 24 which may be an indication of the relative movement or distance travelled between two machine components or assemblies.

In FIG. 4, an assembly 40 is shown including a lead or follower screw 41, the external surface of which contains the spiral thread formation 42 which mates with a spiral thread 47 formed in a bore 46 of a bushing or follower 45 of an assembly 54 which may include a machine component adapted to effect controlled relative movement with the screw 41 and a machine component and assembly supporting such screw. The base 43 of the thread 42 is shown with flat surface 43S containing magnetically detectable marker recordings as described above, for example, formed by the intense radiation beam melting of microminiature islands of metal and the rapid cooling of such melted metal to form a glassy, non-crystalline formation of the metal having magnetic characteristics which differ from the magnetic characteristics of the adjacent and surrounding metal and which may therefor be magnetically detected by a suitable pickup. Such a pickup 48 is shown having a major base or body 49 and an operating detection head or end portion 50 which is positioned, when the pickup is secured within a tapered bore 48 in the base 45 aligning it with the base 43 of the thread to permit it to detect the marker recording provided along such thread. Such marker recordings may comprise the described pulsed radiation beam generated magnetic domains formed by melting the domain material and permitting it to rapidly solidify thereafter into a glassy, noncrystalline metal or may comprise bits, cavities or sinusoidal undulations formed in the surface stratum of the thread base 43, which formations or pits may be magnetically detected or detected by a capacitance detector replacing the magnetic head 48.

The magnetic head 48 may comprise a so called thin film magnetic pickup with its detecting end and gap defined by metal film conductors which provide a miniature magnetic reproduction circuit at the tip or end 50 of the head. If the head is a capacitance detector, it may also comprise a thin film circuit extending to the operating end 50 of the head assembly 48 and operable to detect variations in the cross sectional shape of the thread caused by cavities or undulations formed therein as described. The end face 50E may slidably engage or be positioned just off the surface 43S at the base of the thread 42 a distance less than 0.0005 inches or may slidably engage same when operable in order to magnetically or capacitively detect such variations in material or shape of the thread base or side walls.

In FIG. 5 is shown an arrangement whereby a magnetic or capacitance detection head 58 has its operating end face 60 disposed adjacent to and in sliding contact with or just above the crown or peak 54 of the thread 53 of a screw 52 of the type described. The assembly 51 includes a spirally threaded bushing or follower assembly 55, the spiral thread 56 of which rides in and engages the spiral thread 53 of the screw 52. A tapered bore 57 is provided in the base 55B of the assembly 55 and accomodates the operating end or base 59 of the detection head 58 positioning same to scan the spiral recording track defined by the crown 54 as relative rotational movement is effected between screw 52 and assembly 55. The marker recordings 17 along crown 54 may be magnetically or capacitively detected by the pickup 59 of head 58 and employed to generate pulse electrical signals or analog signals which vary in amplitude whenever a marker recording is sensed, which signals may be fed to a counter for indicating relative movement between the components which support the screw 52 and the assembly 55.

In FIG. 6 is shown a typical electronic control system for determining and indicating relative movement between machine components for assembly by means of counting coded marks provided along one or more walls of the thread 17 of a lead screw 11 as described. Such marks or pulse recordings are sensed by a magnetic or optical sensor 66 which generates output signals which are amplified by an amplifier 67 and shaped by a pulse generator 68 as relatively movement is effected between the sensor and the thread of a lead screw. The output pulses from the pulse generator 68, which are indicative of the degree of rotation of the screw 17, are input to the clock input of an up-down digital counter 74.

Each signal which is applied to counter 74 is indicative of a very small degree of rotation of the screw 17 and an increment or decrement of the movement of the thread thereof. A direction sensor of conventional construction, is provided to generate a true signal for setting the input 70 of a latch 69 if, for example, the screw 17 is rotating in a counterclockwise direction while a true signal is applied to the reset input 71 of the latch 69 if the direction of rotation of the screw 17 is clockwise. The output of latch 69 thus simultaneously controls the counting direction of the counter 74 by toggling the counter's up/down enable input 75. The output of counter 74 is a digital code which is indicative of the count contained therein and is conducted to an input-output interface 85 of a computer 80 and also to a decoder driver 78D of a character display 78 which is operable to provide a digital representation of the count contained in the counter 74.

Also shown in FIG. 6 is means for providing a coarser positioning resolution which means includes a tachometer sensor 82 which is operable to sense the number of revolutions of the shaft of a motor 81 and is operable to convert such information to electrical signals which are amplified by an amplifier 86, shaped by a pulse generator 87 and subsequently applied to the clock input of an up/down counter 88. The coarse resolution position information generated on the output of counter 88 is also passed to the input-output interface 85.

Machine component of tool positioning information input to the input-output interface as described, may be entered and stored in a large scale memory 83, such as magnet tape, disc, bubble or microelectronic memory, by means of computer 80 in accordance with its programming.

The computer 80 may also control the operation of positioning motor 81 through input-output interface 85 and motor driver 89, either interactively with the previously described positioning information or according to its own program. Additionally, relative positioning may be accomplished either by the operation of a manual reset switch 90 or under direction of the computer 80 through the input-output interface 85. A reset signal generated either by the operation of manual reset switch 90, the interface 85 or other suitable means, is passed to the reset inputs R of counters 74 and 88, thereby resetting their internal counts to 0 or to a predetermined count value when a selected 0 position has been reached.

Manually recording of the positioning information may be accomplished at any instant by the momentary actuation of a manual record switch 91. Such actuation is operable to generate a signal which is applied to computer 80 to record the positioning data in the recording means 83, when such signals are generated by means of a debounce circuit 92, such as a one shot multivibrator and input-output interface 85.

Variations and modifications to the hereinbefore described structures and processes are noted as follows:

1. The beam recording techniques illustrated in FIG. 1 wherein recordings are defined by small areas or islands of glassy non-crystalline areas of the surface stratum of the metal intersected by the pulsed laser or electron beam caused by the rapid heating to melt microportions of the metal and rapid cooling thereof in the range of a million degrees per second, may be employed to effect parallel bit recordings in one or more of the walls of the thread of the screw by scanning and pulsing a single beam across the surface or properly pulsing a plurality of closely spaced parallel beams in coded arrays thereof such that the recordings, when scanned by photoelectric detection means or a reading beam and photoelectric detection means composed of a bank of phototransistors, may be used to generate binary code signals or the like which are indicative of the exact location of the screw or the element it follows or drives at the time each parallel bit is recording is reproduced. Sinilarly, the described microcavity recordings may be formed as parallel arrays of bit code recordings with each of such codes occupying a length of the thread about 5 microns or less between such code recordings.

2. Magnetic domain recordings formed as described above may be effected in other record members such metal or metal coated rigid or floppy discs, tape, drums or the like, cards, strips, etc. to be selectively reproduced when the record member is read by a suitable magnetic pickup or beam of laser light reflected from the record surface to a photoelectric detector or bank of same. 3. Electronic circuits and circuit compoents may be formed on a substrate of conducting strips, films and layers of metal and other materials bonded and/or deposited onto such substrate and formed into sircuit elements by one or more known techniques including the described technique of converting select portions of conducting and semiconducting materials such as strip-like portions or interconnects, junctions and the like to non-crystalline, glassy formations of such metal or semi-conducting materials which exhibit magnetic properties different from the adjacent or surrounding material not so heated, melted and rapidly cooled. Switching devies and gates, storage elements and domains and micro-portions or areas of the metal or semiconducting material may be made to exhibit semi-conducting and tunnelling characteristics which are different from those of the surrounding metal or semi-conducting material is not melted by the beam or cooled much slower than the island portions thereof. For example, semiconducting portions may so be formed of a thin strip of metal or a portion of a switching element, such as an in situ formed transistor, by such rapid beam melting of a selected portion of deposited or otherwise provided portion of metal or semiconducting material. Electron sources and sinks may be formed by such glassy metal formation per se or in combination with additional processing such as the conversion of all or a portion of the metal comprising such glassy material or material adjacent thereto to semi-conducting and/or oxide of the metal of glassy metal so formed adjacent such metal. Magnetic storage domains defining portions of a memory matrix or switching circuit may also be so formed.

I claim:

1. Apparatus for indicating distance travelled between machine components comprising:
    a first machine component,
    a spirally threaded screw rotatably supported by said first machine component,
    a second machine component operable to be power driven with respect to said first machine component,
    thread containing means supported by said second component and adapted to be threadably assembled with the spiral thread of said screw,
    means for power rotating said screw in synchronization with the movement between said first and second machine components,
    a portion of the surface of said thread of said screw containing marker recordings therein,
    means supported by said second machine component for sensing said marker recordings of said thread as said screw rotates and effects relative movement between said first and second components and generates variable output signals which vary as each marker of said thread is sensed, and
    means for receiving and recording said output signals.

2. An apparatus in accordance with claim 1 wherein said receiving means includes a counter for counting variations in said signal output by said sensing means.

3. An apparatus in accordance with claim 2 including display means connected to said counter for displaying information defining the degree of relative movement between said first and second machine components.

4. An apparatus in accordance with claim 3 wherein said counter is an up-down counter and said display means is operable to display the relative position of said first machine component with respect to said second machine component.

5. An apparatus in accordance with claim 1 wherein said screw is a lead screw, said means for power rotating said screw comprising a motor for power driving one of said machine components with respect to the other and rotating said screw.

6. An apparatus in accordance with claim 1 wherein said marker recordings comprise undulations formed in a portion of the surface of said thread of said screw.

7. An apparatus in accordance with claim 1 wherein said marker recordings comprise undulations formed in the side walls of said thread.

8. An apparatus in accordance with claim 1 wherein said marker recordings comprise microcavities formed at equispaceings along the length of at least one of the surfaces of said thread and said sensing means is operable to scan incremental portions of the surface of said thread as said screw is rotated.

9. An apparatus in accordance with claim 1 wherein said marker recordings are spaced less than 0.001" apart, there being more than 25 threads to the inch formed in said screw.

10. A method of measuring a dimension comprising:
providing a series of recordings along a thread of a screw, which recordings define increments in the turning of the screw,
connecting the screw to a movable machine element in a manner such that, when the machine element operates, the screw turns in proportion to the operation of the machine element,
operating the machine containing said machine element to perform a given function with respect to work so as to cause the screw to turn,
scanning recordings provided on the thread of the screw with a transducer so as to produce electrical signals on the output of the transducer which signals vary in accordance with the degree of rotation of the screw and the movement of the machine element, and
utilizing said electrical signals to provide data relating to the operation of the machine.

11. A method in accordance with claim 10 wherein the electrical signals produced by scanning the thread of the screw are employed to indicate the degree of movement of the machine element connected to the screw.

12. A method in accordance with claim 11 wherein the degree of movement of the machine element is indicated by employing the electrical signals generated in scanning the thread of the screw to operate and control a visual display.

13. A method in accordance with claim 12 wherein the machine containing the machine element connected to the screw is a measuring machine and the signals generated are pulse signals, further including counting the pulse signals generated to indicate measurements made by the machine.

14. A method in accordance with claim 10 wherein the machine is a machine tool and the signals generated in scanning the thread of the screw are employed to control the operation of the machine tool.

15. A method in accordance with claim 10 wherein the recordings provided along the length of the thread of the screw are single marker recordings indicative of incremental distances along the screw thread.

16. A method in accordance with claim 15 wherein the single marker recordings are electro-optically scannable.

17. A method in accordance with claim 15 wherein the single marker recordings are magnetically recorded along the length of the screw thread and are magnetically sensed to generate said pulse signals.

18. A method in accordance with claim 10 wherein the recordings provided along the length of the screw are code recordings and are operable to generate digital code signals when scanned as the screw rotates.

19. A method in accordance with claim 10 wherein the recordings are effected by means of a pulsed beam of radiation whhich reacts on the recording substrate by melting microportions thereof forming detectable domains or cavities which may be magnetically or electro-optically detected.

* * * * *